United States Patent
Van Wageningen

(10) Patent No.: US 12,009,859 B2
(45) Date of Patent: Jun. 11, 2024

(54) INTERFERENCE SUPPRESSING FOR OPTICAL WIRELESS NETWORKS

(71) Applicant: SIGNIFY HOLDING B.V., Eindhoven (NL)

(72) Inventor: Andries Van Wageningen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 208 days.

(21) Appl. No.: 17/633,706

(22) PCT Filed: Jul. 20, 2020

(86) PCT No.: PCT/EP2020/070418
§ 371 (c)(1),
(2) Date: Feb. 8, 2022

(87) PCT Pub. No.: WO2021/028153
PCT Pub. Date: Feb. 18, 2021

(65) Prior Publication Data
US 2022/0321217 A1 Oct. 6, 2022

(30) Foreign Application Priority Data
Aug. 9, 2019 (EP) .................... 19190969

(51) Int. Cl.
*H04B 10/114* (2013.01)
*H04B 10/116* (2013.01)
(52) U.S. Cl.
CPC ....... *H04B 10/1149* (2013.01); *H04B 10/116* (2013.01)

(58) Field of Classification Search
CPC .................. H04B 10/1149; H04B 10/116
(Continued)

(56) References Cited

U.S. PATENT DOCUMENTS 7,830,834 B2 * 11/2010 Das ............... H04W 48/08
370/445
8,295,705 B2 * 10/2012 Kim ............... H04B 10/116
398/118

(Continued)

FOREIGN PATENT DOCUMENTS

CN 1551546 A 12/2004
CN 101340209 A 1/2009

(Continued)

OTHER PUBLICATIONS

Jiang1 et al; State-of-the-Art Medium Access Control (MAC) Protocols for Underwater Acoustic Networks: A Survey Based on a MAC Reference Model—Feb. 2018; IEEE Communications Surveys and Tutorials; pp. 1-36. (Year: 2018).*

(Continued)

*Primary Examiner* — Amritbir K Sandhu

(57) ABSTRACT

For time-division based wireless optical networks, it is important to keep neighboring coordinators synchronized to a common time base, in order to avoid interference to a network device located in the overlapping area of such neighboring coordinators. However, given that the common time base is located remotely, there is still timing synchronization uncertainty remaining at a coordinator side. A novel auxiliary scheduler subsystem, and the related methods and systems, are disclosed in this invention. By reserving time (Continued)

margins in the allocated time slots by the auxiliary scheduler subsystem, interference due to timing synchronization uncertainty is reduced.

14 Claims, 6 Drawing Sheets

(58) Field of Classification Search
USPC .......................................................... 398/119
See application file for complete search history.

(56) References Cited

U.S. PATENT DOCUMENTS

| | | | |
|---|---|---|---|
| 8,964,640 B2 | 2/2015 | Ko et al. | |
| 10,461,860 B2* | 10/2019 | Miras | H04B 10/116 |
| 11,483,073 B2* | 10/2022 | Van Wageningen | H04B 10/1149 |
| 2005/0058151 A1 | 3/2005 | Yeh | |
| 2008/0232334 A1 | 9/2008 | Das et al. | |
| 2009/0310971 A1* | 12/2009 | Kim | H04W 28/16 398/103 |
| 2011/0105134 A1 | 5/2011 | Kim et al. | |
| 2011/0217044 A1* | 9/2011 | Kang | H04B 10/116 398/67 |
| 2011/0255500 A1 | 10/2011 | Cavalcanti et al. | |
| 2012/0224860 A1* | 9/2012 | Kim | H04B 10/116 398/128 |
| 2012/0302273 A1 | 11/2012 | Lin et al. | |
| 2013/0208708 A1 | 8/2013 | Nezou et al. | |
| 2014/0208387 A1 | 7/2014 | Ganesh et al. | |
| 2014/0269453 A1* | 9/2014 | Papasakellariou | H04L 1/1854 370/280 |
| 2016/0174241 A1* | 6/2016 | Ansari | H01Q 1/32 370/329 |
| 2016/0197675 A1* | 7/2016 | Ganick | H04N 23/56 398/172 |
| 2017/0351946 A1* | 12/2017 | Jayawardena | H04B 10/116 |
| 2019/0020414 A1* | 1/2019 | Jiang | H04W 48/12 |
| 2019/0028193 A1 | 1/2019 | Miras et al. | |
| 2022/0321217 A1* | 10/2022 | Van Wageningen | H04B 10/1149 |

FOREIGN PATENT DOCUMENTS

| | | |
|---|---|---|
| CN | 103249048 A | 8/2013 |
| CN | 104270716 A | 1/2015 |
| CN | 104335669 A | 2/2015 |
| EP | 3442138 A1 | 2/2019 |
| KR | 20110047937 A | 5/2011 |
| KR | 20180043755 A | 4/2018 |
| WO | 2017042593 A1 | 3/2017 |

OTHER PUBLICATIONS

Chen et al; Planning Optimization of the Distributed Antenna System in High-Speed Railway Communication Network Based on Improved Cuckoo Search ; May 2018; Hindawi International Journal of Antennas and Propagation; pp. 1-14. (Year: 2018).*
Chen et al; Planning Optimization of the Distributed Antenna System in High-Speed Railway Communication Network Based on Improved Cuckoo Search; May 2018; Hindawi International Journal of Antennas and Propagation vol. 2018, pp. 1-15. (Year: 2018).*
Haigang et al., "TLTS: A Cluster-Based Two Level TDMA Scheduling Protocol for Large Scale Wireless Sensor Network", Jrnl of Computer Research and Development, 01, Jan. 28, 2007.
IEEE Instrumentation and Measurement Society, IEEE Standard for a Precision Clock Synchronization Protocol for Networked Measurement and Control Systems, IEEE Standard 1588-2008, pp. 1-289.
International Telecommunication Union, ITU-T, Telecommunication Standardization Sector of ITU, G.9972, Jun. 2010.

* cited by examiner

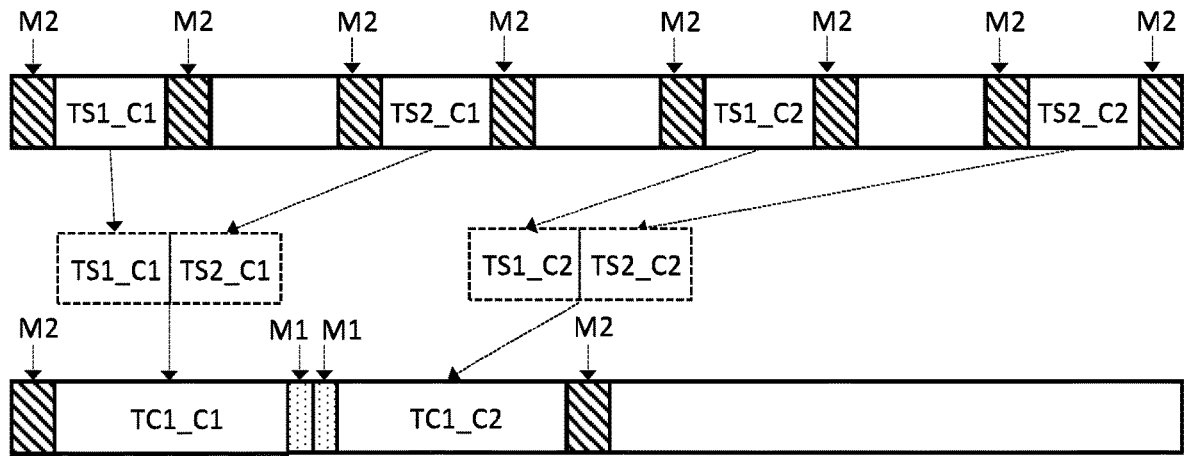
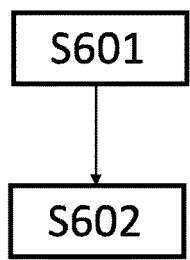
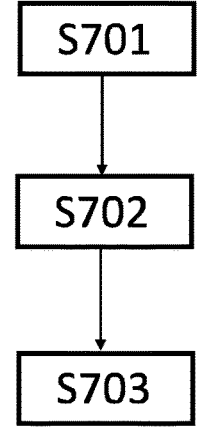
FIG. 7
FIG. 8
FIG. 9

INTERFERENCE SUPPRESSING FOR OPTICAL WIRELESS NETWORKS

CROSS-REFERENCE TO PRIOR APPLICATIONS

This application is the U.S. National Phase application under 35 U.S.C. § 371 of International Application No. PCT/EP2020/070418, filed on Jul. 20, 2020, which claims the benefit of European Patent Application No. 19190969.6, filed on Aug. 9, 2019. These applications are hereby incorporated by reference herein.

FIELD OF THE INVENTION

The invention relates to the field of scheduling transmissions in optical wireless networks, such as LiFi networks. More particularly, various methods, apparatus, systems and computer-readable media are disclosed herein related to a scheduling assistant system.

BACKGROUND OF THE INVENTION

To enable more and more electronic devices like laptops, tablets, and smartphones to connect wirelessly to the Internet for enriched contents, wireless communication confronts unprecedented requirements on data rates and also link qualities, and such requirements are keeping on growing year over year, considering the emerging digital revolution related to Internet-of-Things (IoT). Radio frequency technology like Wi-Fi is running out of spectrum to support this revolution fully. In the meanwhile, Li-Fi is drawing more and more attention with its capability to support higher data rates over the wider bandwidth in visible light, ultraviolet, and infrared spectrums. Other benefits of LiFi include data security, and ability to function safely in areas otherwise susceptible to electromagnetic interference. Therefore, LiFi is a very promising new technology to enable the next generation of immersive connectivity.

Visible-light communication (VLC) transmits data by intensity modulating optical sources, such as light emitting diodes (LEDs) and laser diodes (LDs), faster than the persistence of the human eye. VLC merges lighting and data communications in applications such as area lighting, signboards, streetlights, vehicles, and traffic signals. The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light for communication.

In the star topology, the communication is established between devices and a single central controller, called the coordinator. In the peer-to-peer topology, one of the two devices in an association takes on the role of the coordinator. In the coordinated topology, multiple devices communicate with multiple coordinators, supervised by a global controller. The global controller has a fixed network link to each coordinator.

For handling interference in an optical wireless communication system, or a LiFi system, with multiple access points (APs) having overlapping coverage area based on time-division, the APs must be synchronized to a common time base. IEEE Std 1588-2008 describes a protocol to synchronize distributed clocks across a network, whereby a high accuracy can be achieved by dedicate support from routers/switches in the network. However, with an existing infrastructure, the routers/switches may not yet support this protocol by nature, and hence, the uncertainty of the synchronization increases, which also results in interference to the end points (EPs) located in the overlapping area of adjacent APs.

SUMMARY OF THE INVENTION

In view of the above, the present disclosure is directed to methods, apparatus, systems, computer program and computer-readable media for providing a mechanism to handle the timing synchronization uncertainty. More particularly, various computer-readable media (transitory and non-transitory), methods, systems and apparatus are provided to alleviate potential interference, resulting from the timing synchronization uncertainty between neighboring coordinators, to an EP or network device located in the overlapping area of the neighboring coordinators, in a resource-efficient way.

In accordance with a first aspect of the invention an auxiliary scheduler subsystem is provided. The auxiliary scheduler subsystem for reducing interference in an optical wireless communication, OWC, network having a line-of-sight character, the OWC network comprising at least two coordinators (C1-Cn) and a plurality of network devices (D1-Dn) selectively associated to and synchronized with a respective one of the coordinators (C1-Cn), and wherein the at least two coordinators and the plurality of network devices share a same optical wireless medium of the OWC network via a time-division multiple access, TDMA, approach by dividing the wireless medium into consecutive time slots, at least part of the auxiliary scheduler subsystem co-located with a coordinator and wherein the auxiliary scheduler subsystem is configured: to determine a first margin representing a time-interval needed to tolerate a deviation of a local time of a coordinator from a remote timing reference due to timing synchronization uncertainty of the coordinator against the remote timing reference; and to reserve the first margin within an allocated time slot of the coordinator, which is adjacent to a neighboring time slot allocated to another coordinator than the allocated time slot.

Advantageously, this invention proposes to reserve a margin in the allocated time slot to reduce potential interference from adjacent neighboring coordinators resulted from timing synchronization uncertainty. By customizing the size of the margin per coordinator, such as according to the actual synchronization accuracy of the individual coordinator, the chance of reserving an unnecessarily large margin is reduced. Therefore, the present invention provides a nice tradeoff between interference suppression and resource efficiency.

In one example, the size of the time slots can be different per coordinator or per OWC network, and the size may also be configured per application. For applications with high throughput requirement, such as video streaming, a longer duration of a single time slot may be a more practical design choice.

Let us consider the situation that each individual coordinator operates according to the same approach by reserving a first margin within the allocated time slot of the coordinator, which is adjacent to a neighboring time slot allocated to another coordinator. For a boundary between two adjacent time slots allocated to two different coordinators, from each side of the boundary there is a reserved first margin belonging to an individual coordinator. These two first margins may not be the same size, but each of them reflects a sufficient time interval to avoid overlapping of the two adjacent time slots due to an individual timing synchronization uncertainty.

In an embodiment, the auxiliary scheduler subsystem is further configured: to determine a second margin representing another time-interval needed to tolerate timing synchronization uncertainty between the coordinator and any other coordinator in the OWC network; and to reserve the second margin within the allocated time slot of the coordinator, which is adjacent to another neighboring time slot, when information on allocation of the other neighboring time slot is unavailable at the auxiliary scheduler subsystem.

Advantageously, this provides a precaution for the situation that not all the coordinators in the OWC network implement the invention as disclosed in the first aspect. In order to coexist with those coordinators that do not implement the disclosed method or if the information on allocation of the neighboring time slot is unavailable, the coordinator may have to reserve a second margin to compensate for the potential impact. Since the second margin represents the time-interval needed to tolerate timing synchronization uncertainty between the coordinator and any other coordinator in the OWC network, the second margin will be larger than the first margin.

In another embodiment, the first margin is device-dependent and determined based on one of: an estimation of the deviation of the local time of the coordinator from the remote timing reference, a first predefined value, a first configurable value assigned by a user, wherein the second margin is determined based on one of: the first margin, a second predefined value, a second configurable value assigned by a user; and wherein the second margin is at least two times the first margin.

To synchronize with a remote timing reference, the deviation of the local time of the coordinator from the remote timing reference is mainly resulted from the time transfer latency from the remote reference to the local clock, which includes both the processing delay of the operating system, and also the network latency created by hubs, switches, cables, and other hardware components that exist between the remote reference clock and the local clock. The processing delay is typically more deterministic and can be derived from parameters such as the computation capability of the device, the response times of the operating frequency of the operating system, and the complexity of the timing calculation algorithm. The effect of the processing delay on the deviation of the local time from the remote reference time can be largely reduced with timestamping-based synchronization protocol. The network latency is more uncertain, because it depends on the length of the path between the remote time reference and the auxiliary scheduler subsystem, how many hardware components are located on the path, and the dynamic traffic condition in the network. If the network is heavily loaded, more buffering time will be needed at routers or switches.

Therefore, the device-dependent first margin may be determined based on an estimation of the deviation of the local time of the coordinator from the remote reference time, which can be derived from variations on adjustments of the local time resulted from different time transfer latencies from the remote timing reference to the coordinator, or a further processed value calculated from the variations. Such an estimation can be measured dynamically, and it can also be measured during an initiation phase, and then the value is stored as a predefined value. The predefined value can also be determined according to the topology of the network, or a certain system default value. It is also possible that the first margin is set by a user as a configurable value, depending on the user's preference on the tradeoff between interference suppression and resource efficiency.

In an embodiment, the first margin is device-dependent and determined based on an estimation of the deviation of the local time of the coordinator from the remote timing reference, and wherein the estimation of the deviation is determined based on a protocol between the at least part of the auxiliary scheduler subsystem co-located with the coordinator and a remote synchronization server, and the protocol comprising multiple exchange cycles of synchronization messages; and wherein the remote synchronization server, is connected to the at least part of the auxiliary scheduler subsystem via a wired connection and is configured to provide the remote timing reference by attaching local timing information to the synchronization messages; and wherein the auxiliary scheduler subsystem is configured to: derive the estimation of the deviation of the local time from the remote timing reference based on varying adjustments of the local time resulted from different time transfer latencies over the multiple exchange cycles of the synchronization messages.

Preferably, an at least 3-way handshake protocol is used to determine an offset or deviation of a local clock as compared to a remote time reference. The remote synchronization server attaches timestamps corresponding to the remote time reference in the synchronization messages exchanged during the handshake. By assuming an identical time transfer latency on the path from the remote synchronization server to the auxiliary scheduler and on the path from the auxiliary scheduler to the remote synchronization server, it is likely that the time transfer latency will be cancelled out in the timing calculation based on the handshake, and only an offset between the local clock and the remote time reference remains. Given that the offset comes from the drift of the local oscillator that changes very slowly as compared to the time duration for completing the time synchronization handshake, the local clock is expected to be synchronized more precisely to the remote timing reference. However, due to the variations on the time transfer latency, which is essentially asymmetric and time-varying as explained above, the time transfer latency may not be cancelled out completely with the handshake protocol. Given that clock drifting is typically very slow as compared to the duration of signaling handshake, by carrying out several measurements in an extended handshake procedure and comparing the difference among the results from the several measurements, the estimation of variations on the time transfer latency can be derived therefrom. Note that those different results are mainly resulted from variation on the time transfer delay other than clock drifting. And hence, by sacrificing a small portion of the allocated time slot, the first margin, the impact of the timing synchronization uncertainty to the system is reduced.

Advantageously, the impact of dynamic network condition on the time transfer delay can be mitigated by filtering of the measurement results over multiple cycles, which leads to a tighter estimation of the deviation of the local time from the remote timing reference. And hence the first margin can be chosen to improve resource usage.

In one embodiment, the auxiliary scheduler subsystem is further configured to bundle more than one time slot intended for use by the same coordinator continuously into a time channel; and wherein the first margin is only reserved within the allocated time channel adjacent to a neighboring time slot or time channel allocated to another coordinator; and the second margin is only reserved within the allocated time channel adjacent to another neighboring time slot or time channel when information on allocation of the other neighboring time slot or time channel is not available at the auxiliary scheduler subsystem.

It is advantageous to bundle more than one time slot allocated to the same coordinator consecutively into a time channel. And hence, the number of boundaries adjacent to a neighboring time slot allocated to another coordinator and the occasions that the knowledge of allocation of the neighboring time slot will be reduced substantially. In that sense, less margins need to be reserved, and the efficiency of the time resource will be improved.

In one embodiment, the auxiliary scheduler subsystem has a centralized structure, wherein the auxiliary scheduler subsystem is comprised in a first coordinator out of the at least two coordinators, and wherein the auxiliary scheduler subsystem is further configured to: exclude use of the reserved first margin and/or the reserved second margin from the use of the allocated time slot or time channel, by prohibiting transmitting or receiving by the first coordinator during the reserved first margin and/or the reserved second margin. The centralized approach allows a coordinator to implement localized TDMA scheduling control as well as local reservation of the margins for interference suppression. The benefit is that there is less coordination effort imposed to the network controller, imaging that there are quite a lot of coordinators connected to a same network controller. Of course, for the system perspective, this is a localized optimization, given that a single coordinator does not have an overview of all the other coordinators. Preferably, neighboring coordinators may cooperate and align their operation if they are aware of their neighbor relationship. An end device in the overlapping area of the neighboring coordinators or the network controller can help the coordinators establish such neighboring relationship.

In another embodiment, the auxiliary scheduler subsystem has a distributed structure, wherein the auxiliary scheduler subsystem is divided over two parts, and wherein a first part is comprised in a second coordinator out of the at least two coordinators, and a second part is comprised in a network controller, which is connected to the second coordinator via a wired connection, and wherein the first part is configured to: determine the first margin and transmit a first message based on the first margin to the second part; and the second part is configured to: determine the second margin and transmit a second message based on the second margin to the first part; and the first part is further configured to: exclude use of the first margin and/or the second margin from the allocated time slot or time channel, by prohibiting transmitting or receiving by the second coordinator during the reserved first margin and/or the reserved second margin.

Advantageously, with the second part of the auxiliary scheduler subsystem deployed in the network controller, more information can be shared among different coordinators at the network controller side for further performance improvement. For example, the second margin of a certain coordinator can be determined by considering the first margin of the coordinator itself and a maximum of a set of other first margins from other coordinators. Such a distributed setup of the auxiliary scheduler subsystem allows for a centralized TDMA scheduling control at a network controller and leaves the reservations of the margins locally implemented at a coordinator. The benefit of this approach is that the centralized TDMA scheduling at the network controller can be a global optimization, since the network controller has the overview of the entire network. During the scheduling, the network controller can take the physical deployment of the system into account, such as proximity and/or overlapping of the coverage of two coordinators. The second margin may also be derived more optimized, such as by having the knowledge of the maximum deviation of the first margins between any two coordinators in the network.

Alternative, the second part of the auxiliary scheduler subsystem in the network controller is not dedicated to a single coordinator anymore. Instead, only the first part of the auxiliary scheduler subsystem is dedicated to a certain coordinator, while the second part of the auxiliary scheduler subsystem is shared by different coordinators at the network controller. And then the allocation information and the first margin values for individual coordinator can be shared directly among these different coordinators connected to the same network controller, which makes the system even more efficient.

In one embodiment, a system is provided for reducing interference by means of a time-division multiple access, TDMA, approach, the system comprising: an optical wireless communication, OWC, network with a line-of-sight character comprising at least two coordinators (C1-Cn) and a plurality of network devices (D1-Dn) selectively associated to and synchronized with a respective one of the coordinators (C1-Cn), and wherein the at least two coordinators and the plurality of network devices share a same wireless medium of the OWC network via a TDMA approach by dividing the wireless medium into consecutive time slots; and a network controller, which is connected to the at least two coordinators via a wired connection; and the first coordinator out of the at least two coordinators comprising the auxiliary scheduler subsystem according to the centralized structure of the auxiliary scheduler subsystem; and a remote synchronization server connected to the auxiliary scheduler subsystem via a wired connection.

In a particularly advantageous system, a network device out of the plurality of network devices, located in an overlapping area of coverage of the at least two coordinators, is associated to the first coordinator and is configured to: monitor the communication on the allocated time slot or time channel from the first coordinator; and send a message to the first coordinator to indicate when interference from another coordinator is experienced in the allocated time slot or time channel; and wherein the auxiliary scheduler subsystem, comprised in the first coordinator, that receives the message from the network device is further configured to: extend the first margin and/or the second margin according to the message received when the time slot or time channel is allocated exclusively to the first coordinator.

Given that the first and second margins represent estimations, a network device in the overlapping area of adjacent coordinators may still experience interference in the time slot or time channel exclusively allocated to the coordinator. This disclosed feature provides opportunity for the network device to notify the associated coordinator, to extend the first margin and/or the second margin for interference avoidance.

More advantageously, this option also gives more flexibility to the system. Since there may not always be a network device located in the overlapping area of adjacent coordinators, the coordinator may start with a more optimistic estimation of the deviation of the local time from the remote timing reference and apply a relative small value for the first margin and/or the second margin, in order to use the allocated time slot more efficiently. And then later on, according to a message from a network device reporting the interference experienced, the coordinator can then adaptively increase the first and/or the second margin.

In another embodiment, a system for reducing interference by means of a time-division multiple access, TDMA, approach, the system comprising: an optical wireless communication, OWC, network with a line-of-sight character comprising at least two coordinators (C1-Cn) and a plurality of network devices (D1-Dn) selectively associated to and synchronized with a respective one of the coordinators (C1-Cn), and wherein the at least two coordinators and the plurality of network devices share a same wireless medium of the OWC network via a TDMA approach by dividing the wireless medium into consecutive time slots; and a network controller, which is connected to the at least two coordinators via a wired connection; and the auxiliary scheduler subsystem according to the distributed structure of the auxiliary scheduler subsystem, and wherein the first part of the auxiliary schedule subsystem is comprised in the second coordinator out of the at least two coordinators, and the second part of the auxiliary schedule subsystem is comprised in the network controller; and a remote synchronization server connected to the first part of the auxiliary scheduler subsystem via a wired connection.

In yet another embodiment, another network device out of the plurality of network devices, located in an overlapping area of coverage of the at least two coordinators, is associated to the second coordinator and is configured to: monitor the communication on the allocated time slot or time channel from the second coordinator; and send a message to the second coordinator to indicate when interference from another coordinator is experienced in the allocated time slot or time channel; and wherein the first part of the auxiliary scheduler subsystem, comprised in the second coordinator, that receives the message from the other network device is further configured to: extend the first margin and/or the second margin according to the message received when the time slot or time channel is allocated exclusively to the second coordinator.

In a further embodiment, the network controller is further configured: to aggregate time slots or time channels allocated to different coordinators next to each other, in order to reduce the usage of the second margin as compared to the first margin; and to inform at least one of the at least two coordinators about the boundaries of an allocated time slot or time channel and allocation information on a neighboring time slot if the neighboring time slot is allocated to another coordinator.

Similar to the auxiliary scheduler subsystem, the system may also bundle multiple time slots, allocated to the same coordinator, continuously into a time channel, the network controller can also aggregate time slots or time channels from different coordinators next to each other. And then the chance to use the second margin other than the first margin, when the information on allocation of the neighboring time slot or time channel is unavailable, is reduced. Given that the second margin is larger than the first margin, it is another way to improve the usage of the resource. These two methods can be used in a combined way.

Another aspect of the invention is the method for reducing interference in an optical wireless communication, OWC, network having a line-of-sight character using a time-division multiple access, TDMA, approach, the OWC network comprising at least two coordinators (C1-Cn) and a plurality of network devices (D1-Dn) selectively associated to and synchronized with a respective one of the coordinators (C1-Cn), and wherein the at least two coordinators and the plurality of network devices share a same wireless medium of the OWC network via a TDMA approach by dividing the wireless medium into consecutive time slots, the method comprising: determining a first margin representing a time-interval needed to tolerate a deviation of the local time from a remote timing reference due to timing synchronization uncertainty of a coordinator against the remote timing reference; and reserving the first margin within an allocated time slot of the coordinator, which is adjacent to a neighboring time slot allocated to another coordinator than the allocated time slot.

In one embodiment, the method further comprising: determining a second margin representing another time-interval needed to tolerate timing synchronization uncertainty between the coordinator and any other coordinator in the OWC network; and reserving the second margin within an allocated time slot of the coordinator, which is adjacent to another neighboring time slot, when information on allocation of the other neighboring time slot is unavailable.

In another embodiment, the method further comprising: bundling more than one time slot intended for use by the same coordinator continuously into a time channel; and wherein the first margin is only reserved within the allocated time channel adjacent to a neighboring time slot or time channel allocated to another coordinator; and the second margin is only reserved within the allocated time channel adjacent to another neighboring time slot or time channel when information on allocation of the other neighboring time slot or time channel is not available.

The first margin can be determined according to the deviation of the local time of the coordinator from the remote time reference, and such deviation depends to a large extend on the variations on a time transfer latency from the remote timing reference. Preferably, the method further comprising: determining the first margin based on an estimation of variations on a time transfer latency from the remote timing reference; determining the estimation of variations on a time transfer latency from the remote timing reference based on a protocol between the auxiliary scheduler subsystem and a remote synchronization server, and the protocol comprising multiple exchange cycles of synchronization messages; and wherein the remote synchronization server, connected to the auxiliary scheduler subsystem via a wired connection; providing the remote timing reference by attaching local timing information to the synchronization messages by the remote synchronization server; and deriving the estimation of variations on the time transfer latency from the remote timing reference by the auxiliary scheduler subsystem based on varying adjustments of the local time resulted from different time transfer latencies over the multiple exchange cycles of the synchronization messages.

In another embodiment, the method further comprising a network device out of the plurality of network devices in the OWC network: monitoring the communication on an allocated time slot or time channel of an associated coordinator; and sending a message to at least one of the at least two coordinators to indicate when interference from another coordinator, other than the associated coordinator, is experienced in the allocated time slot or time channel; extending the first margin and/or the second margin according to the message received, if the time slot or time channel is allocated exclusively to the associated coordinator.

The invention may further be embodied in a computer program comprising code means which, when the program is executed by a computer, cause the computer to carry out the method of the auxiliary scheduler subsystem.

The invention may further be embodied in a computer program comprising code means which, when the program is executed by a computer, cause the computer to carry out the method of the network device, the coordinator, and the network controller.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 7 demonstrates the method to aggregate time slots or time channels allocated to different coordinators next to each other;

FIG. 8 shows a flow diagram of a method carried out by an auxiliary scheduler subsystem for reducing interference in an OWC network;

FIG. 9 shows a flow diagram of a method carried out by a network device in an OWC network.

DETAILED DESCRIPTION OF EMBODIMENTS

Figure 1:
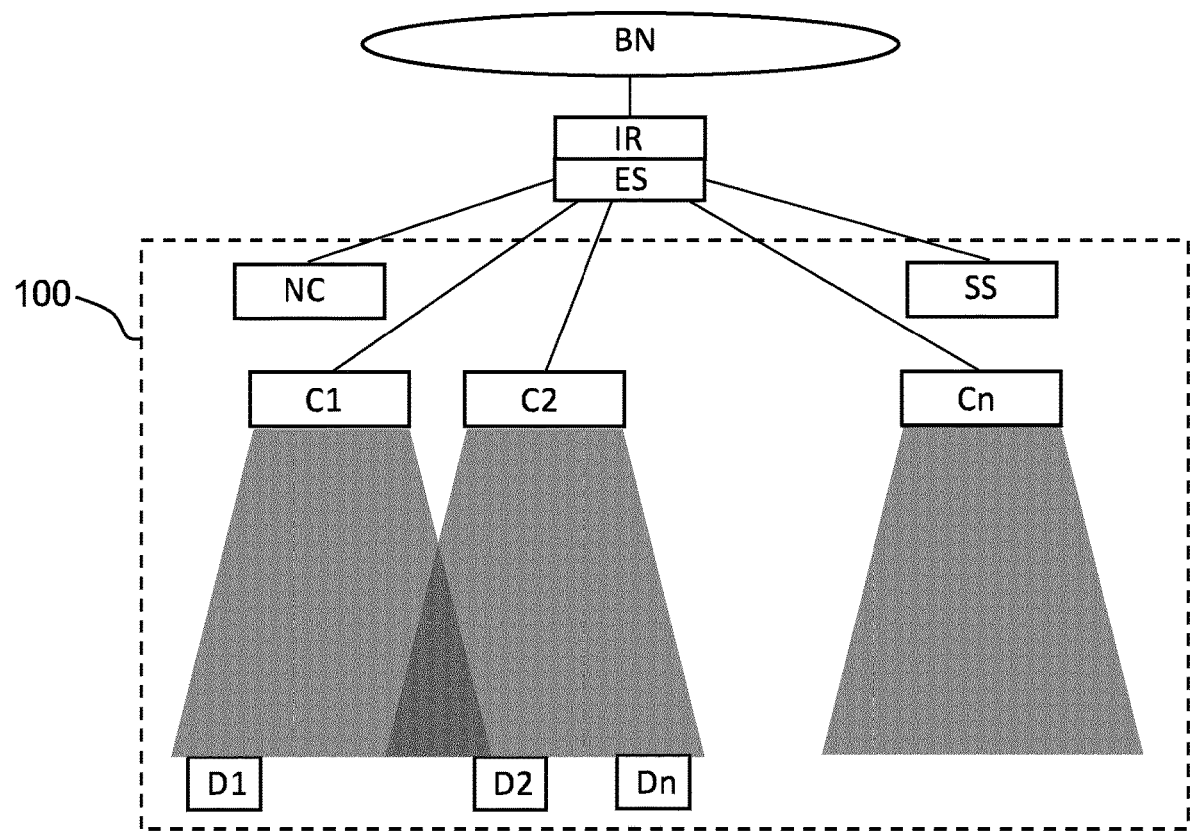
FIG. 1 demonstrates an optical wireless communication network system connected to a backbone network.

Various embodiments of the present invention will now be described based on an optical wireless communication (OWC) network system 100 as shown in FIG. 1. For illustration purposes, the OWC network is connected to a backbone network (BN) via an IP router IR and an Ethernet switch ES, while in a practical system more routers and switches may be connected in between. Within the OWC network system 100, there is a network controller NC, a remote synchronization server SS, at least two coordinators C1-Cn and a plurality of network devices D1-Dn selectively associated to and synchronized with a respective one of the coordinators C1-Cn. Because of the line-of-sight character of the optical communication link, adjacent coordinators C1-Cn do not have a direct link among each other. A network device D1-Dn located in the overlapping area of the coverage of adjacent coordinators is able to detect optical signals from both coordinators, which may lead to interference to the network device if it has a downlink communication with the associated coordinator, while the neighboring coordinator also has an active downlink communication. The system uses a time-division multiple access, TDMA, approach by dividing the wireless medium into consecutive time slots, the interference problem to the network device in the overlapping area may be alleviated, if adjacent coordinators do not use the same slot for a downlink communication. Of course, this is based on the assumption that adjacent coordinators are synchronized to a common timing reference.

For an OWC network, there can be different approaches to achieve such synchronization. It may be realized locally by detecting the zero-crossings of AC mains. Given the relatively low frequency of the AC mains and the potential high spur levels, the zero-crossing based approach is not very reliable to achieve high-accuracy synchronization. An alternative is to achieve the synchronization based on a common remote timing reference, such as a clock at a remote synchronization server.

The clock synchronization problem has been studied thoroughly in the areas of Internet and local area networks (LANs) for the last several decades. There are many well-known protocols for maintaining synchronization in computer networks. As explained in the summary section, one primary problem to be solved in the network-based clock synchronization is the time transfer latency, which includes both the processing delay of the operating system, and also the network latency created by hubs, switches, cables, and other hardware components that exist between the remote reference clock and the local clock. The processing delay is more deterministic, while the network latency is much more uncertain. The network latency depends on the length of the path between the remote timing reference and the local clock, the number of hardware components located on the path, and also the dynamic traffic condition in the network. If the network is heavily loaded, more buffering time will be needed at routers or switches, which all adds up to the time transfer latency from the remote timing reference to the local clock. In an opposite scenario, if the network is of very little traffic and no buffering time needed at routers and switches, the time transfer latency will be much shorter as compared to the previous scenario.

The first margin can be determined based on an estimation of the deviation of the local time of the auxiliary scheduler subsystem from the remote timing reference. Given that the network-dependent deviation results mainly from the time transfer latency, the estimation of the deviation can be made by measuring the variations of the time transfer latency over multiple synchronization message exchanges and applying a further filtering processing to the measurement results of the variations. Advantageous examples of the filtering methods can be:

to perform outlier removal, i.e. to exclude time measurements that are above a predetermined threshold and must be considered as wrong, which would result in unnecessarily large margins and/or an integrating filter or filter with an integrating component to reduce the impact of transient network load variations allowing tighter margins.

Figure 2:
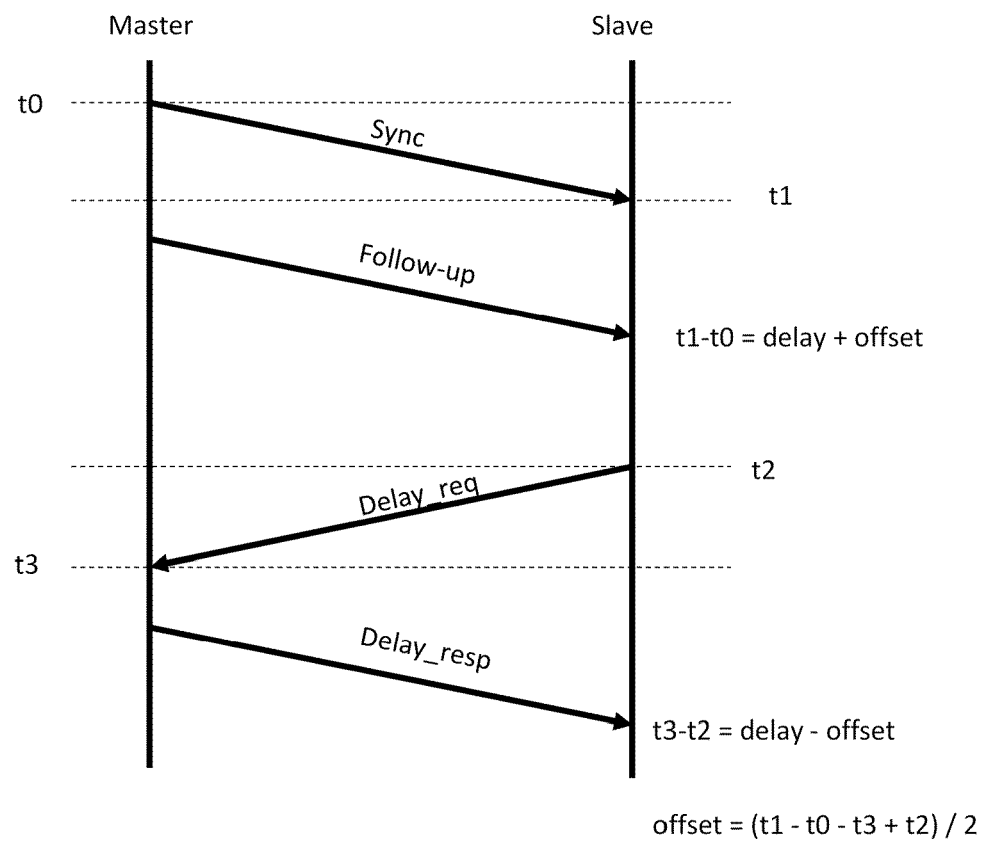
FIG. 2 illustrates a handshake protocol between a master device and a slave device for timing synchronization with the exchange of synchronization messages.

FIG. 2 illustrates an advantageous handshake protocol between a master device and a slave device for timing synchronization with the exchange of synchronization messages. The master device represents the remote synchronization server, while the slave device represents an auxiliary scheduler subsystem or alternatively a coordinator, which tries to synchronize with the remote synchronization server. The master sends a sync message and measures the time at which it sends this message out at local time to. It stores the time of its transmission (t0) or is followed by a follow-up message containing the information of t0. The slave measures the time at which it receives the Sync message at local time t1. The slave requests the master for a delay measurement (Delay-req) at local time t2 on which the master responds with a message (Delay-resp) with the local reception time t3. By assuming that the delay is the same for the forward (Sync) and the backward (Delay_req) path, the slave determines its time-offset with the master to correct its local time. It is important that the delay from the generation of a timestamp to the reception of the timestamp can be measured accurately. Variations in the delay will lead to further uncertainty in synchronization. To minimize the delay variation, a node should trigger the generation of a timestamp as close as possible to the moment of transmitting a Sync or Delay-req message (t0 and t2) and should trigger the generation of a timestamp as close as possible to the moment of receiving a Sync or Delay-req message (t1 and t3). Any intermediate components in the network (e.g. switch/router) should provide means to handle the internal delay it causes to these messages, e.g. by recovering, the original time internally (boundary clock), or by adding the internal delay into a correction field of the message (transparent clock). The precision clock synchronization protocol introduced in IEEE 1588-2008 standard may solve the problem by achieving sub-microsecond level of accuracy. However, to implement this protocol, it requires dedicated support from routers and switches in the network. In order to make use of the existing infrastructure that does not support this protocol, tolerance to certain timing synchronization uncertainty should be considered in the system design. In addition, support for the IEEE 1588-2008 protocol comes at a premium price point which may not be acceptable in all situations.

Figure 3:
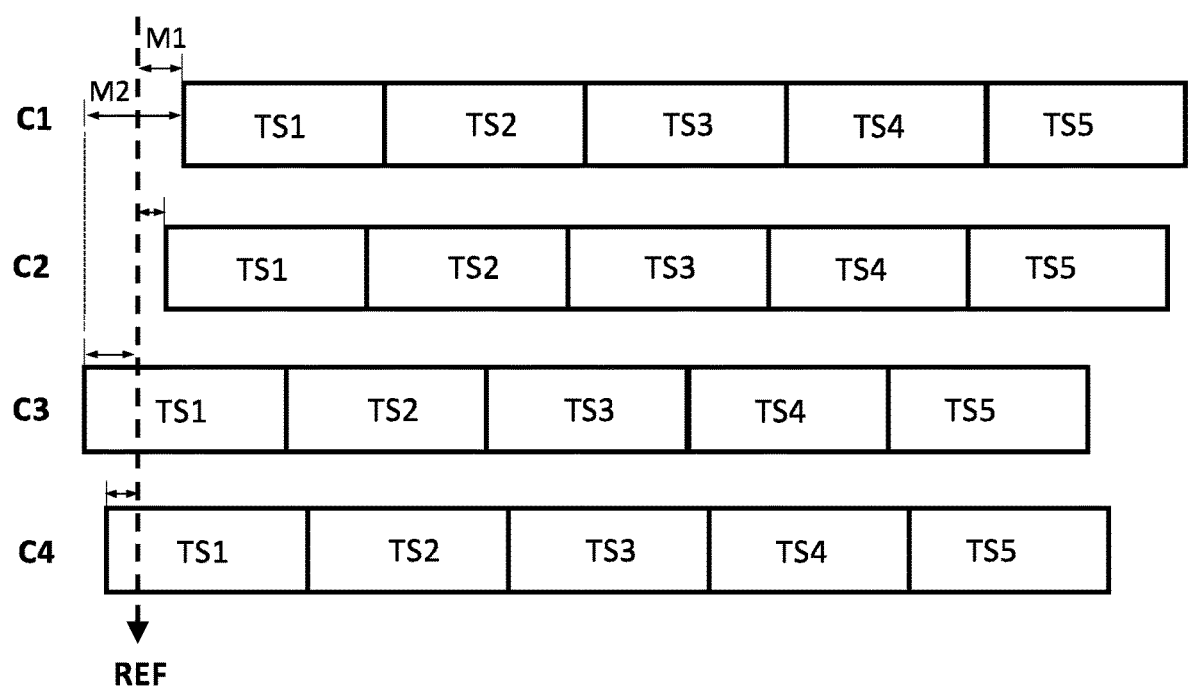
FIG. 3 illustrates the timing synchronization uncertainties of different coordinators as compared to a remote timing reference.

FIG. 3 illustrates the timing synchronization uncertainties of different coordinators as compared to a remote timing reference. As shown in the figures, all the four coordinators C1-C4 try to synchronize with the same remote timing reference with a same protocol, but in reality, the local clock as compared to the reference shows deviations. As explained above, this can happen due to several factors, such as the length of the path from individual coordinator to the remote synchronization server, the number of intermediate components (routers and switches) on the path, and also the instantaneous load conditions on the network when the synchronization messages are circulated during the handshake. Therefore, a network device in the overlapping area may experience interference near the boundary of an exclusively allocated time slot next to an adjacent time slot that is allocated to a neighboring coordinator.

One simple approach is to add a fixed interval at the two boundaries of a time slot, by prohibiting any communication in that interval, to compensate the effect of timing synchronization uncertainty. Given the variations of synchronization performance, a relatively big margin may be required, which results in a very inefficient usage of the limited radio resource, which is here divided into time slots.

Thus, applicant has recognized and appreciated that it would be beneficial to reserve a first margin, which represents the actual timing synchronization uncertainty between a coordinator and a remote timing reference, in an allocated time slot of the coordinator adjacent to a neighboring time slot allocated to another coordinator. By customizing the size of the margin per coordinator, the chance of reserving an unnecessarily large margin is reduced. Therefore, the present invention provides a nice tradeoff between interference suppression and resource efficiency.

If all the coordinators in the network implement the same method by reserving individual first margins in their allocated time slots, the potential interference coming from synchronization uncertainty, to a network device in the overlapping area of neighboring coordinators can be solved efficiently. However, in reality, it can also be the case that not all the coordinators implement the disclosed method. In order to coexist with those coordinators that do not implement the disclosed method or if the information on allocation of the neighboring time slot is unavailable, the coordinator may have to reserve a second margin to compensate the potential impact. Since the second margin represents the time-interval needed to tolerate timing synchronization uncertainty between the coordinator and any other coordinator in the OWC network, the second margin will be larger than the first margin. In one example, the coordinator may reserve two times the first margin as the second margin.

Referring back to FIG. 3, we take C1 as an example for illustration purpose. The first margin of C1 is indicated by M1, which is derived from the measurement against a remote timing reference. The second margin M2 for C1 is shown in the figure is the tightest margin that prevents interference or collisions, which is the maximum deviation between C1 and any other coordinators, C2-C4 in this example. Given the different first margin of the other coordinators, i.e. the time deviation between time reference REF and the respective start of their first time slot TS1, M2 of C1 is determined to be the deviation between C1 and C3. In this case, M2 can be realized if C1 has the knowledge of all individual first margins at the other coordinators in the system. One alternative is that by making use of topology information, an ideal set up of M2 can be realized if C1 has the knowledge of the individual first margins of its neighboring coordinators that could cause interference or a collision. Another alternative is that C1 may determine the value of M2 only based on its own M1, such as to set M2 to a value of two times M1, although merely a heuristic, it will reduce the likelihood of interference or collisions due to lack of synchronization.

Although excessively large size of the first margin and/or the second margin is prevented by reserving the first margin according to the actual timing synchronization uncertainty, it is still desirable to minimize the usage of such margins. One way to achieve this goal is to bundle more than one time slot allocated to the same coordinator into a time channel, and then to reduce the chances to have two adjacent time slots allocated to different coordinators, or to have the allocation information unavailable for the neighboring time slot.

Figure 4:
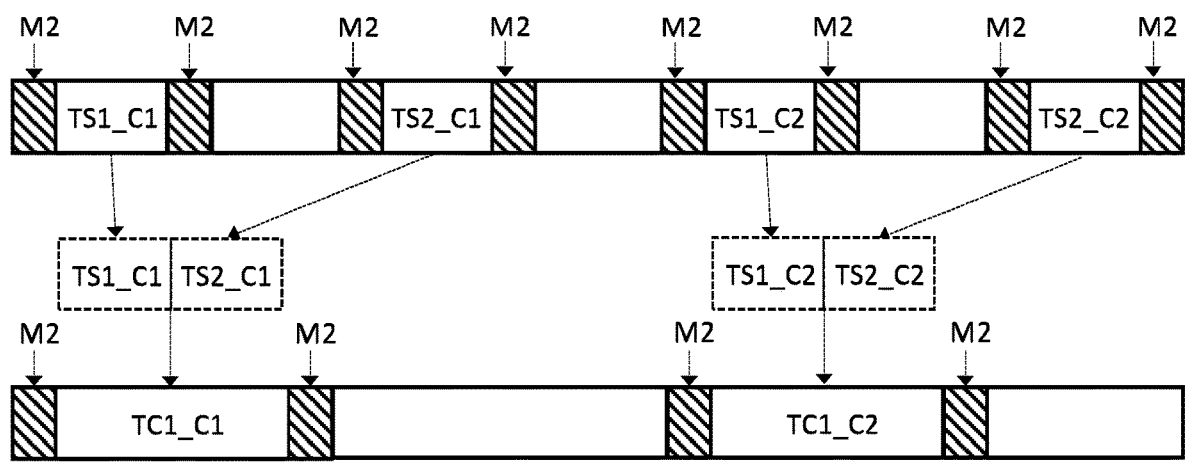
FIG. 4 demonstrates the method to bundle more than one time slot allocated to the same coordinator into a time channel.

As illustrated in FIG. 4, four time slots are allocated to two neighboring coordinators. As indicated by the naming of the allocated time slots, TS1_C1 an TS2_C1 are the two time slots allocated to the coordinator C1, while TS1 C2 an TS2 C2 are the two time slots allocated to the coordinator C2. Initially, the four allocated time slots are distributed in the time frame, with some slots in between, whose allocation information is unavailable. Therefore, second margin M2 is reserved in all the four allocated time slots. According to one embodiment, the auxiliary scheduler subsystems of C1 and C2 bundle more than one time slot intended for use by the same coordinator continuously into a time channel, which is indicated by TC1_C1 and TC1_C2 in FIG. 4. And hence, the number of reserved margins is reduced by a factor of two. By bundling more time slots consecutively into a time channel, the enhancement to resource efficiency can be substantial.

Of course, considering different traffic arrival models belonging to different applications and also delay constraints, this method is not always applicable. The key idea here is to bundle as many time slots belonging to the same coordinator as possible, when other performance criteria are still satisfied. One example can be the time slots allocated to a certain coordinator are grouped into several clusters, and each cluster has serval time slots allocated consecutively. The grouping can be made according to latency requirement, traffic arrival models, network load condition, or a tradeoff among such factors.

Figure 5:
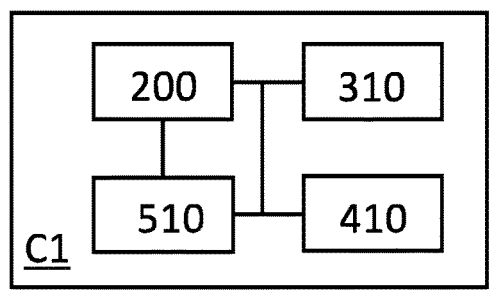
FIG. 5 schematically depicts a centralized structure of the auxiliary scheduler subsystem.

FIG. 5 illustrates a centralized structure of the auxiliary scheduler subsystem 200, where the auxiliary scheduler subsystem 200 is comprised fully in a coordinator. in this example, it is coordinator C1. The auxiliary scheduler subsystem 200 is at least connected to a transceiver 310 for wired communication, a transceiver 410 for wireless optical communication in the OWC network, and a controller 510. The figure schematically depicts example components to be relevant to the description of this invention, and in practice other components may be comprised to fulfill the functionality of a typical coordinator in an OWC network. The auxiliary scheduler subsystem 200 is further configured to exclude use of the reserved first margin and/or the reserved second margin from the use of the allocated time slot or time channel, by prohibiting transmitting or receiving by the first coordinator during the reserved first margin and/or the reserved second margin.

The centralized structure allows a coordinator to be self-contained in implementing scheduling control and interference suppression via reserving margins related to timing synchronization uncertainty. This approach requires reduced supervision from the network controller. However, given the fact that a single coordinator does not have an overview of all the other coordinators, this is a kind of local optimization at each coordinator side.

Figure 6:
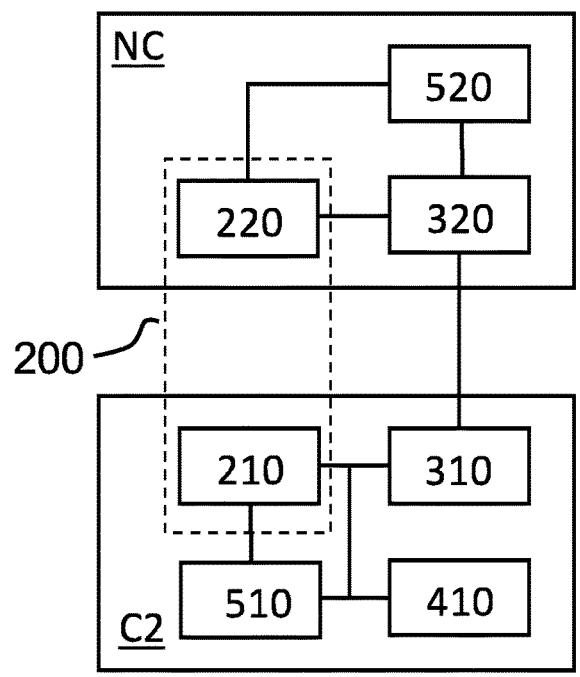
FIG. 6 schematically depicts a distributed structure of the auxiliary scheduler subsystem.

FIG. 6 illustrates a distributed structure of the auxiliary scheduler subsystem 200, which includes two parts, the first part 210 and the second part 220. The first part 210 is comprised in a second coordinator C2, while the second part 220 is comprised in the network controller (NC). In C2, the first part 210 is at least connected to a transceiver 310 for wired communication, a transceiver 410 for wireless optical communication in the OWC network, and a controller 510. In NC, the second part 220 is at least connected to a transceiver 320 for wired communication, and a controller 520. Same here, the figure schematically depicts example components to be relevant to the description of this invention, and in practice other components may be comprised to fulfill the functionality of a typical coordinator and a network controller in an OWC network. With the distributed system, the functionality of the auxiliary scheduler subsystem is distributed among the two parts 210 and 220.

By incorporating the second part 220 in the network controller, which has better overview of the entire OWC network, it can become even more efficient for the system. For example, the second part 220 is configured to determine the second margin. The second part 220 has the information from the first part about the first margin of the coordinator, which may be based on actual measurement. The second part may also know from the network controller a set of other first margins from other coordinators, and hence the second margin can be determined by adding the first margin of the coordinator and a maximum of the set of other first margins from other coordinators.

Furthermore, when using a distributed setup of the auxiliary scheduler subsystem, the network controller may determine which coordinators include the first part and which coordinators do not. In addition, when network devices report coordinators in view, the network controller can establish which coordinators are proximate to one another (i.e. that the coordinators have an overlapping coverage area). Consider the situation wherein the network controller establishes that a first coordinator that does not include a first part, and all other coordinators do. Further consider that the first coordinator is proximate to a second coordinator then the first and second coordinator need to reserve the second margin, because they have no knowledge of each other's first margin. However, when a third coordinator is not proximate to the first coordinator, this third coordinator does not need to reserve the second margin.

Alternatively, the second part comprised in the network controller is shared with different coordinators, which means instead of a separate second part for each coordinator, the network controller comprises a single second part for multiple coordinators. And then, first margin information of individual coordinator, and optionally but advantageously allocation information, or even neighboring information, can be shared with and among different coordinators directly. Advantageously, this helps to reduce the chance that the second margin is set unnecessarily large, or a second margin is reserved in the situation when a first margin is sufficient.

Another alternative, the second part transmits the maximum of the set of first margins (instead of the second margin) to the first part, from which the first part determines the second margin by itself. And then, different coordinators may take different approaches in making the tradeoff between resource efficiency and interference suppression with a kind of overview of the timing synchronization uncertainties from other coordinators, by knowing the maximum of the set of first margins.

To further improve the efficiency of the usage of radio resource, it is also preferred to replace the second margin with the first margin when possible, given that the second margin is always larger than the first margin. Therefore, it is encouraged to aggregate time slots or time channels allocated to different coordinators next to each other, instead of leaving some time slots in-between with information on allocation unavailable. This method can be used in combination with the method as illustrated in FIG. 4. As demonstrated in FIG. 7, a further improvement is made by combining the two methods. By comparing the allocation in FIG. 7 against in FIG. 4, it shows that in this case two second margins are replaced with two first margins. If the network controller applies this method as much as possible with different coordinators, the time slots are arranged in a more compact and more efficient way.

In one embodiment, a coordinator may start with an optimistic estimation of the first margin, because there is no network device associated to this coordinator locating in an overlapping area of the coverage between this coordinator and a neighboring coordinator. And then, at a certain point of time, a new network device moves into that overlapping area. During the communication with the associated coordinator, the network device experiences interference in the time slot that is allocated exclusively to the associated coordinator. The network device will then send a message to inform the associated coordinator about the interference. The auxiliary scheduler subsystem comprised in the associated coordinator with the centralized structure, or the first part of the auxiliary scheduler subsystem comprised in the associated coordinator with the distributed structure, will then upon the received message from the network device extend the first and/or the second margin adaptively. By further detecting that network device left the coverage of the associated coordinator, the associated coordinator may decide to recover the original setting/value of the first and/or the second margin.

FIG. 8 shows a flow diagram of a method carried out by an auxiliary scheduler subsystem for reducing interference in an OWC network. In step S601, the auxiliary scheduler subsystem determines a first margin representing a time-interval needed to tolerate timing synchronization uncertainty of a coordinator against a remote timing reference. And then in step S602, the first margin is reserved within an allocated time slot of the coordinator, which is adjacent to a neighboring time slot allocated to another coordinator than the allocated time slot.

FIG. 9 shows a flow diagram of a method carried out by a network device in an OWC network. Although margins are reserved by the coordinators in the allocated time slots or time channels, it is still possible that interference is experienced by a network device located in the overlapping area of two neighboring coordinators. Because such margins are based on instantaneous measurement and estimations, they may not cover all the scenarios. To solve that problem, in step S701, the network device monitors the communication on an allocated time slot or time channel of an associated coordinator. And then in step S702, the network device sends a message to at least one of the at least two coordinators to indicate when interference from another coordinator, other than the associated coordinator, is experienced in the allocated time slot or time channel. If the time slot or time channel is allocated exclusively to the associated coordinator, the auxiliary scheduler subsystem will extend the first margin and/or the second margin according to the message received in step S703.

The feedback mechanism of the network device allows the auxiliary scheduler subsystem to firstly set a more conservative or optimistic first or second margin, for better resource efficiency. Only when a network device in the overlapping area experiences interference, which indicates that such conservative first or second margin is not sufficient, the auxiliary scheduler subsystem will then extend the margins adaptively.

The methods according to the invention may be implemented on a computer as a computer implemented method, or in dedicated hardware, or in a combination of both.

Executable code for a method according to the invention may be stored on a computer program product. Examples of computer program products include non-volatile memory devices, optical storage devices, integrated circuits, servers, online software, etc. Preferably, the computer program product comprises non-transitory program code means stored on a computer readable medium for performing a method according to the invention when said program product is executed on a computer.

In a preferred example, the computer program comprises computer program code means adapted to perform the steps of a method according to the invention when the computer program is run on a computer. Preferably, the computer program is embodied on a computer readable medium.

Methods, systems and computer-readable media (transitory and non-transitory) may also be provided to implement selected aspects of the above-described embodiments.

The term "controller" is used herein generally to describe various apparatus relating to, among other functions, the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified It should also be understood that, unless clearly indicated to the contrary, in any methods claimed herein that include more than one step or act, the order of the steps or acts of the method is not necessarily limited to the order in which the steps or acts of the method are recited. Also, reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases.

The invention claimed is:

1. An auxiliary scheduler for reducing interference in an optical wireless communication (OWC) network having a line-of-sight character, the OWC network comprising at least two coordinators and a plurality of network devices selectively associated to and synchronized with a respective one of the coordinators, and wherein the at least two coordinators and the plurality of network devices share a same optical wireless medium of the OWC network via a time-division multiple access (TDMA) approach by dividing the wireless medium into consecutive time slots, at least part of the auxiliary scheduler co-located with a coordinator;
wherein the auxiliary scheduler is configured:
to determine a first margin representing a time-interval needed to tolerate a deviation of a local time of the coordinator from a remote timing reference due to timing synchronization uncertainty of the coordinator against the remote timing reference;
to reserve the first margin within an allocated time slot of the coordinator, which is adjacent to a neighboring time slot allocated to another coordinator than the allocated time slot;
to determine a second margin representing another time-interval needed to tolerate timing synchronization uncertainty between the coordinator and any other coordinator in the OWC network; and
to reserve the second margin within the allocated time slot of the coordinator, which is adjacent to another neighboring time slot, when information on allocation of the other neighboring time slot is unavailable at the auxiliary scheduler subsystem.

2. The auxiliary scheduler of claim 1, wherein the first margin is device-dependent and determined based on one of:
an estimation of the deviation of the local time of the coordinator from the remote timing reference, a first predefined value, or a first configurable value assigned by a user,
wherein the second margin is at least two times the first margin and is determined based on one of:
the first margin, a second predefined value, or a second configurable value assigned by a user.

3. The auxiliary scheduler of claim 1, wherein the first margin is device-dependent and determined based on an estimation of the deviation of the local time of the coordinator from the remote timing reference,
wherein the estimation of the deviation is determined based on a protocol between the at least part of the auxiliary scheduler co-located with the coordinator and a remote synchronization server, and the protocol comprising multiple exchange cycles of synchronization messages; and
wherein the remote synchronization server, is connected to the at least part of the auxiliary scheduler via a wired connection and is configured to provide the remote timing reference by attaching local timing information to the synchronization messages; and
wherein the auxiliary scheduler is configured to:
derive the estimation of the deviation of the local time from the remote timing reference based on varying adjustments of the local time resulted from different time transfer latencies over the multiple exchange cycles of the synchronization messages.

4. The auxiliary scheduler of claim 1, wherein the auxiliary scheduler is further configured to:
bundle more than one time slot intended for use by the coordinator continuously into a time channel;
wherein:
the first margin is only reserved within the allocated time channel adjacent to a neighboring time slot or time channel allocated to another coordinator; and
the second margin is only reserved within the allocated time channel adjacent to another neighboring time slot or time channel when information on allocation of the other neighboring time slot or time channel is not available at the auxiliary scheduler.

5. The auxiliary scheduler of claim 1, wherein the auxiliary scheduler is comprised in a coordinator out of the at least two coordinators, and wherein the auxiliary scheduler is further configured to:
exclude use of the reserved first margin and/or the reserved second margin from the use of the allocated time slot or time channel, by prohibiting transmitting or receiving by the coordinator during the reserved first margin and/or the reserved second margin.

6. The auxiliary scheduler of claim 1, wherein the auxiliary scheduler is divided over two parts, wherein a first part of the auxiliary scheduler is comprised in the coordinator, and a second part of the auxiliary scheduler is comprised in a network controller, which is connected to the coordinator via a wired connection, and
wherein the first part is configured to:
determine the first margin and
transmit a first message based on the first margin to the second part; and
wherein the second part is configured to:
determine the second margin; and
transmit a second message based on the second margin to the first part; and
wherein the first part is further configured to:
exclude use of the first margin and/or the second margin from the allocated time slot or time channel, by prohibiting transmitting or receiving by the coordinator during the reserved first margin and/or the reserved second margin.

7. A system for reducing interference by means of a time-division multiple access (TDMA) approach, the system comprising:
an optical wireless communication (OWC) network with a line-of-sight character comprising at least two coordinators and a plurality of network devices selectively associated to and synchronized with a respective one of the coordinators, and wherein the at least two coordinators and the plurality of network devices share a same wireless medium of the OWC network via a TDMA approach by dividing the wireless medium into consecutive time slots; and
a network controller, which is connected to the at least two coordinators via a wired connection;
a coordinator out of the at least two coordinators comprising the auxiliary scheduler according to claim 6; and
a remote synchronization server connected to the auxiliary scheduler via a wired connection.

8. The system of claim 7, wherein a network device out of the plurality of network devices, located in an overlapping area of coverage of the at least two coordinators, is associated to the coordinator and is configured to:
- monitor the communication on the allocated time slot or time channel from the coordinator; and
- send a message to the coordinator to indicate when interference from another coordinator is experienced in the allocated time slot or time channel;
- wherein the auxiliary scheduler, comprised in the coordinator, that receives the message from the network device is further configured to:
- extend the first margin and/or the second margin according to the message received when the time slot or time channel is allocated exclusively to the coordinator.

9. A system for reducing interference by means of a time-division multiple access (TDMA) approach, the system comprising:
- an optical wireless communication (OWC) network with a line-of-sight character comprising at least two coordinators (C1-Cn) and a plurality of network devices selectively associated to and synchronized with a respective one of the coordinators, and wherein the at least two coordinators and the plurality of network devices share a same wireless medium of the OWC network via a TDMA approach by dividing the wireless medium into consecutive time slots;
- a network controller, which is connected to the at least two coordinators via a wired connection;
- the auxiliary scheduler according to claim 7, wherein the first part of the auxiliary schedule is comprised in a coordinator out of the at least two coordinators, and the second part of the auxiliary schedule is comprised in the network controller; and
- a remote synchronization server connected to the first part of the auxiliary scheduler via a wired connection.

10. The system of claim 9, wherein another network device out of the plurality of network devices, located in an overlapping area of coverage of the at least two coordinators, is associated to the coordinator and is configured to:
- monitor the communication on the allocated time slot or time channel from the coordinator; and
- send a message to the coordinator to indicate when interference from another coordinator is experienced in the allocated time slot or time channel;
- and wherein the first part of the auxiliary scheduler, comprised in the coordinator, that receives the message from the other network device is further configured to:
- extend the first margin and/or the second margin according to the message received when the time slot or time channel is allocated exclusively to the coordinator.

11. The system of claim 7, wherein the network controller is further configured:
- to aggregate time slots or time channels allocated to different coordinators next to each other, in order to reduce the usage of the second margin as compared to the first margin; and
- to inform at least one of the at least two coordinators about the boundaries of an allocated time slot or time channel and allocation information on a neighboring time slot if the neighboring time slot is allocated to another coordinator.

12. A method for reducing interference in an optical wireless communication (OWC) network having a line-of-sight character using a time-division multiple access (TDMA) approach, the OWC network comprising at least two coordinators and a plurality of network devices selectively associated to and synchronized with a respective one of the coordinators, and wherein the at least two coordinators and the plurality of network devices share a same wireless medium of the OWC network via a TDMA approach by dividing the wireless medium into consecutive time slots, the method comprising:
- determining a first margin representing a time-interval needed to tolerate a deviation of a local time of a coordinator from a remote timing reference due to timing synchronization uncertainty of the coordinator against the remote timing reference;
- reserving the first margin within an allocated time slot of the coordinator, which is adjacent to a neighboring time slot allocated to another coordinator than the allocated time slot;
- determining a second margin representing another time-interval needed to tolerate timing synchronization uncertainty between the coordinator and any other coordinator in the OWC network; and
- reserving the second margin within the allocated time slot of the coordinator, which is adjacent to another neighboring time slot, when information on allocation of the other neighboring time slot is unavailable at the auxiliary scheduler subsystem.

13. The method of claim 12, the method further comprising a network device out of the plurality of network devices in the OWC network:
- monitoring the communication on an allocated time slot or time channel of an associated coordinator;
- sending a message to at least one of the at least two coordinators to indicate when interference from another coordinator, other than the associated coordinator, is experienced in the allocated time slot or time channel; and
- extending the first margin and/or the second margin according to the message received, if the time slot or time channel is allocated exclusively to the associated coordinator.

14. A non-transitory computer readable medium comprising instructions which, when the instructions are executed by a computer, cause the computer to carry out the method of claim 12.

* * * * *